United States Patent [19]

Evans et al.

[11] 4,110,500

[45] Aug. 29, 1978

[54] PACKAGED ARTICLES

[75] Inventors: Theodore A. Evans; William A. Watts, both of Uniontown, Ohio

[73] Assignee: The Goodyear Tire & Rubber Company, Akron, Ohio

[21] Appl. No.: 835,259

[22] Filed: Sep. 21, 1977

Related U.S. Application Data

[63] Continuation of Ser. No. 728,483, Sep. 30, 1976, abandoned, which is a continuation-in-part of Ser. No. 618,301, Sep. 29, 1975, abandoned.

[51] Int. Cl.$^2$ .................... B32B 7/02; B65D 71/00; C08L 51/00
[52] U.S. Cl. ......................................... 428/35; 53/33; 206/524.6; 206/524.7; 260/876 B; 428/215; 428/517; 428/519; 428/521
[58] Field of Search ............. 206/524.6, 524.7; 53/33; 260/23.7 M, 23.7 R, 32.6 A, 876 B, 846, 829, 28.5 B, 880 B; 428/35, 215, 517, 519, 521

[56] References Cited

U.S. PATENT DOCUMENTS

| | | | |
|---|---|---|---|
| 2,617,775 | 11/1952 | Newberg et al. | 260/889 |
| 3,281,382 | 10/1966 | Kuester et al. | 260/736 |
| 3,632,540 | 1/1972 | Unmuth | 260/28.5 B |
| 3,726,944 | 4/1973 | Bennett et al. | 260/846 |
| 3,837,994 | 9/1974 | Flanagan et al. | 260/28.5 B |
| 3,923,722 | 12/1975 | Lakshmanan | 260/829 |
| 3,932,330 | 1/1976 | Lakshmanan | 260/28.5 B |
| 4,017,654 | 4/1977 | Evans et al. | 428/40 |

FOREIGN PATENT DOCUMENTS 794,200   9/1968   Canada ............................ 220/43

*Primary Examiner*—William R. Dixon, Jr.
*Attorney, Agent, or Firm*—H. C. Young, Jr.

[57] ABSTRACT

A package comprised of an article selected from unvulcanized rubber, compounding ingredients for unvulcanized rubber and compounding ingredients for thermoplastic polymers wrapped in a protective film composite compatible with said unvulcanized rubber or thermoplastic polymer respectively. Said film composite is comprised of an admixture of (1) an unvulcanized elastomeric block copolymer and (2) a thermoplastic aromatic group-containing resin characterized by being soluble in styrene. The invention is further directed to a method of preparing the package and to compounding high unsaturation rubber and thermoplastic polymers prepared by mixing said package with high unsaturation rubber or thermoplastic rubber respectively.

23 Claims, No Drawings

PACKAGED ARTICLES

This is a continuation of application Ser. No. 728,483, filed Sept. 30, 1976, now abandoned, which was a continuation-in-part of application Ser. No. 618,301, filed Sept. 29, 1975, now abandoned.

This invention relates to a packaging film composite and to packaged unvulcanized rubber and packaged compounding ingredients for various resins and plastics therewith. The invention further relates to a method of compounding rubber and plastics.

Heretofore, various wrapping materials have been used for packaging unvulcanized rubber and for packaging compounding ingredients used for rubber and plastics. For example, films of polyethylene have been used for these purposes.

However, polyethylene films have many times presented serious dispersion incompatibility difficulties in the processing and compounding of rubber and various plastic materials. Defective products and articles prepared therefrom containing inherent weaknesses and inconsistent physical properties have occurred because of discrete polyethylene particle content.

Wrappings of styrene-butadiene-styrene block copolymers have been suggested for wrapping bales of rubber because of their compatability with various rubbers thereby avoiding the serious disadvantages of polyethylene film. An example of such a method is found in Canadian Pat. No. 794,200.

However, the solution of one problem has been found to create new disadvantages in the field of packaging unvulcanized rubber and compounding ingredients therefor. Such packaging or wrapping films are desirably required to be as thin as reasonably possible yet maintain a substantial and sufficient degree of structural integrity and dimensional stability under stress. Film rupture is a particular potential where large unvulcanized rubber bales are packaged, stored against similar bales, transported and thrown about. The generally commercially available styrene-butadiene-styrene and styrene-isoprene-styrene block copolymers containing 40 percent or less bound styrene are tyically of insufficient mechanical strength. Film rupture due to the actual flow of rubber or plastic during storage can be a problem. Thus, for such thin films, series difficulties, such as excessive rupture, can arise for restraining, the cold flow of packaged unvulcanized rubber, or the redistribution of compounding gredients or for preserving the package integrity under in-transit shock loads.

Therefore, it is an object of this invention to provide a suitable packaging film composed of an unvulcanized block copolymer composite for packaging unvulcanized rubber and for packaging various compounding ingredients therefor as well as to provide a corresponding method for compounding the rubber itself.

In accordance with this invention, it has been discovered that a packaging film composite for packaging or wrapping, unvulcanized rubber and for compounding ingredients therefor having a thickness in the range of about 0.5 to about 10, preferably about 0.75 to about 5.0 mils comprises an admixture of (1) about 80 to about 45 weight percent, based on 100 percent by weight, of an unvulcanized elastomeric block copolymer having the general configuration A—B—A wherein each A is an independently selected nonelastomeric monovinyl aromatic hydrocarbon polymer block selected from styrene, α-methyl styrene and vinyl toluene having an average molecular weight of about 7,000 to about 25,000 and a glass transition temperature above about 25° C., the total block A content being from about 20 to about 40 percent by weight of the copolymer, and B is an elastomeric conjugated diene polymer block selected from 1,3-butadiene and isoprene having an average molecular weight from about 30,000 to about 100,000 and a glass transition temperature below about 10° C., said block copolymer being further characterized by having a melt viscosity in the range of about 0.1 to about 10 grams/10 minutes according to ASTM No. D-1238 and, correspondingly (2) about 20 to about 55 weight percent of at least one thermoplastic aromatic group-containing resin selected from at least one polymer of styrene, α-methyl styrene, styrene/α-methyl styrene, vinyl toluene, vinyl toluene/α-methyl styrene, indene resins, alkyl phenolic resins, and petroleum and coal tar resins characterized by having an intrinsic viscosity in toluene at 30° C. of about 0.02 to about 0.5.

It is understood that such film composite desirably contains various typical antiblocking agents, lubricants, fillers, pigments and stabilizers.

The elastomeric block copolymers useful in the practice of this invention for the packaging of rubber or various compounding ingredients can be of either the radial-type or of the linear type. Generally, styrene-butadiene-styrene block copolymer is desired.

In general, the radial-type block copolymers are prepared by coupling AB block polymers with polyfunctional agents as described in U.S. Pat. No. 3,281,382.

In general, the linear block copolymer type is prepared by any of the methods commonly used for block copolymers of styrene and butadiene; for example (1) by first preparing "living" polystyryl lithium from styrene and an alkyl lithium and adding this to a mixture of styrene-butadiene, (2) by mixing either lithium metal or a dilithium alkyl (e.g., tetramethylene dilithium), both of which are reported to grow at both ends, (3) by preparing polystyryl lithium and sequentially polymerizing butadiene and then styrene, or (4) polymerizing butadiene with polystyryl lithium and coupling with coupling agents known to those skilled in this art.

The thermoplastic aromatic resins useful in the practice of this invention for packaging rubber or various compounding ingredients are aromatic resins desirably selected from styrene, α-methylstyrene, α-methylstyrene/vinyl toluene, α-methylstyrene/styrene, vinyl toluene, indenes, modified phenolics and resins from petroleum and coal-derived monomers, characterized by having an intrinsic viscosity in toluene at 30° C. of about 0.02 to about 0.5.

In general, the aromatic resins are prepared by conventional polymerization techniques, well known to those skilled in the art.

The film composite itself is prepared by (a) dissolving the block polymer, resin, protective agents, and performance additives in a suitable solvent, (b) casting the resultant cement onto a suitable substrate, (c) drying the film, and (d) removing the film from the substrate. The film composite can also be prepared by using melt processing techniques (extrusion and calendering).

Unvulcanized rubber can be advantageously packaged according to this invention. Representative of the various unvulcanized rubbers are natural rubber, synthetic cis-1,4-polyisoprene, rubbery polymers of 1,3-butadiene, butadiene-styrene emulsion or solution formed rubbery copolymers and copolymers of butadiene and acrylonitrile. All of these heretofore identified rubbers are of the high unsaturation type. Namely, they contain an appreciable amount of carbon-to-carbon double bonds therein. Although this invention is partly directed to the packaging of the high unsaturation-type rubbers, the low unsaturation type can also be packaged if desired. Representative of such low unsaturation rubbers are butyl rubber, which is typically a copolymer containing a major amount of isobutylene and a minor amount of isoprene, as well as the various ethylene/propylene copolymers and rubbery terpolymers of ethylene/propylene and a minor amount of conjugated diene.

Various rubber compounding resins and ingredients especially resins such as hydrocarbon resins can be packaged according to this invention and then compounded with the unvulcanized rubber. Representative of the various compounding ingredients are fillers, such as clay, silicates, calcium carbonate and the like; accelerators, such as, for example, cadmium diethyldithiocarbamate, tetramethyl thiuram disulfide, benzothiazyl disulfide and the like; antioxidants, such as the well known substituted phenolic, substituted thio esters and amine type; anti-ozonants, such as aniline derivatives, diamines and thioureas; curatives, such as sulfur, sulfur providing compounds and peroxides; ultraviolet agents such as substituted benzotriazoles and substituted benzophenones; color pigments, such as iron oxide, titanium dioxides and organic dyes; reinforcing pigments, such as carbon black, zinc oxide and hydrated silicon compounds; and processing aids, such as polyethylenes, silicon dioxide, pumice and stearate.

In order for the film to be useful as a packaging composite for packaging unvulcanized rubber and various compounding ingredients, it is necessary to mix with the composite an anti-block agent to prevent the film from sticking to itself. This additive is particularly required where the packaged materials are stacked or "containerized" together in order to prevent them from sticking to each other and making them virtually impossible to separate without actually destroying portions of the package and material. For this purpose, various well-known anti-block agents can be used, representative of which are fatty acid amides, silicones, soaps, waxes, pigments, vegetable lecithins, etc.

The block polymer/resin composite film of the present invention has numerous technical advantages which will be evident from the following discussion.

Polyethylene film (PE) is generally used to overwrap bales of rubber to simplify handling and use. For most applications, the overwrapped bale is used intact; thus the bale is charged into a banbury or another suitable mixer and the PE film is dispersed throughout the rubber compound during the mixing cycle. However, in various applications, the dispersed PE film has caused defects to occur in the end-product during use and is, therefore, not a suitable overwrap. Films of this invention disperse readily in a rubber compound when mixed using conventional equipment. Even if complete dispersion is not achieved, defects in the subject film are minimized because of the inherent ability to co-cure in the rubber matrix.

In other applications, PE film can present problems. For the production of high impact polystyrene (HIPS), polybutadiene (BR) or butadiene/styrene rubber (SBR) is added directly to the styrene monomer. The overwrap must be characterized by being soluble in styrene, and, therefore, PE film is not considered suitable for this application. Thus, HIPS film is used to overwrap SBR or BR for use in the production of HIPS, which presents an entirely different problem. If the overwrapped SBR or BR does not meet rigid specification limits, it cannot suitably be used for the manufacture of HIPS or even used for conventional purposes because the HIPS overwrap does not disperse readily in conventional rubber compounds. However, the composite film of the present invention, having an additional enhanced structural stability, is soluble in styrene, dispersable in rubber compounds during conventional mixing cycles, and has the ability to co-cure in the rubber matrix. Therefore, the composite of this invention overcomes the previous deficiencies and eliminates a requirement for maintaining an inventory of two (PE and HIPS) packaging films.

Because of the technical advantages cited above, the film composite of this invention can readily be used for the packaging of various compounding ingredients for unvulcanized rubber and various plastics where (1) dispersability, (2) ability to co-cure with rubber, or (3) styrene solubility is a requisite.

Therefore, in further accordance with this invention, a packaged unvulcanized rubber, particularly a high-unsaturation rubber as hereinbefore described and particularly a packaged unvulcanized rubber bale intended for storage, comprises such unvulcanized rubber substantially encompassed with an overwrap of the film composite of this invention. Indeed, the invention is especially useful for the storage of large unvulcanized rubber bales. The term overwrap relates to the film as applied to the unvulcanized rubber, especially when in bale form. For bale wrapping, two sheets of film are generally used. One sheet is applied to the top of the rectangular shaped bale and the other to its bottom. The sheets are then wrapped around the sides of the bale and their peripheries heat sealed together.

In additional accordance with this invention, a method of compounding rubber is provided, and the corresponding, compounded rubber is provided which comprises mixing, and the resulting admixture including the sulfur cured admixture, said method comprising mixing packaged unvulcanized rubber, particularly hereinbefore described high unsaturation rubber, over wrapped with the film composite of this invention and conventional compounding ingredients, particularly such ingredients packaged in the film composite of this invention, optionally followed by sulfur curing said prepared mixture of rubber, packaging film and packaged compounds.

The practice of this invention is further illustrated by reference to the following examples which are intended to be representative rather than restrictive of the scope of the invention. Unless otherwise indicated, all parts and percentages are by weight.

EXAMPLE I

A thermoplastic film composition consisting of 100 parts by weight of an unvulcanized elastomeric styrene-butadiene-styrene block polymer (SBS) blended with 100 parts by weight thermoplastic α-methyl styrene polymer. In the block copolymer, said polystyrene block is a thermoplastic polymer portion having a molecular weight in the range of about 10,000 to about 15,000 and where said diene polymer portion is a rubbery polybutadiene block having a molecular weight in the range of about 60,000 to about 70,000 and further characterized by having a melt viscosity of less than 1 gram/10 minutes according to ASTM No. 1238 and containing about 30 parts by weight polystyrene block and correspondingly about 70 parts by weight polybutadiene block. Said α-methyl styrene resin is characterized by having an intrinsic viscosity in toluene at 30° C. of about 0.13. A small amount of modifiers, antiblock agents and stabilizers were included in the blend. The composite or blend itself was prepared by dissolving the ingredients in tetrahydrofuran at a temperature of about 50° C. The mixture was then cast, dried and removed from the casting surface to yield a 1 mil film.

A test to evaluate block, or the tendency of the film to stick to itself, was run by placing two film samples together, face-to-face, so that a 2-inch by 2-inch, two-ply specimen was obtained. The specimen was placed between two metal plates in a horizontal position and a 1.6 pound per square inch pressure was placed on top of the upper plate. The assembly was placed in a static hot air oven at about 77° C. for about 24 hours. At the end of this time, the film was tested for resistance to blocking by measuring the force in grams to separate the films by pulling them apart at about a 90° angle at a rate of about 20 inches per minute.

Block test results favorably indicated that less than 10 grams of force was required to separate the two plies of film.

In addition, physical property tests were conducted to determine structural integrity of the film, results of which are shown in the following Table 1.

physical property data in Example I. This test also indicated that the film composition possessed the proper dimensional stability while under stress.

EXAMPLE III

A thermoplastic film composition consisting of 100 parts by weight of the styrene-butadiene-styrene of Example I blended with 75 parts by weight of α-methyl styrene thermoplastic polymer of Example I with attendant additives was melt processed into a 0.75 mil film. The film was tested according to the method of Example II with similar results.

EXAMPLE IV

An experiment was conducted where films of Example I and III were evaluated for dispersability in unvulcanized butadiene/styrene copolymer rubber (SBR). The dispersion evaluation was conducted by mixing one percent of the film with SBR on a heated 6 inch × 12 inch mill. In this case 3.6 grams of film was added to 360 grams of SBR which had been previously mill massed 30 seconds at a mill roll gap of 0.010 to 0.015 inch and a mill roll temperature of about 210° to 212° F. The sheeted rubber mix was continuously passed through the mill gap until all the film was visibly dispersed into the rubber. This test is rather severse since in actual practice the film wrapping on a bale of rubber is typically only about 0.125 percent of the individual bale

| PHYSICAL PROPERTIES OF SBS AND SOME SBS/RESIN BLENDS | | | | | |
|---|---|---|---|---|---|
| Properties | Linear SBS (30% styrene) + no resin | Linear SBS (30% styrene) + 75 phr resin | Linear SBS (30% styrene) + 100 phr resin | Radial SBS (30% styrene) + no resin | Radial SBS (30% styrene) + 75 phr resin |
| Gauge (mils) | 1.2 | 1.1 | 1.3 | 1.0 | 1.0 |
| Tensile yield (psi) | 330 | 670 | 750 | 255 | 375 |
| 100% Modulus (psi) | 260 | 580 | 640 | 290 | 410 |
| 300% Modulus (psi) | 280 | 755 | 970 | 410 | 1460 |
| 500% Modulus (psi) | 425 | 1810 | 1940 | 875 | 2750 |
| Ultimate Tensile(psi) | 3000 | 2750 | 2150 | 2950 | 2960 |
| Elongation(%) | 820 | 645 | 580 | 705 | 525 |
| Elmendorf (gms/mil) | 115 | 653 | 818 | 97 | 410 |

The resin used was α-methyl styrene resin having 0.13 intrinsic viscosity in toluene at 30° C.

The tensile strength (pounds per square inch) and elongation were determined by ordinary rubber testing techniques. The Elmendorf tear is a measure of the tear resistance of the film in grams force at 90° per mil thickness to cause the tear.

Note that with the thermoplastic resin addition, all of the tensile yield, modulus, and Elmendorf tear strength increased although the elongation decreased.

EXAMPLE II

Wrapped bales were prepared of polybutadiene in the thermoplastic film composition of Example I (100 parts SBS, 100 parts thermoplastic α-methyl styrene resin). The 14 inch × 28 inch × 7 inch bales were wrapped and the film heat sealed on the edges to form the bale envelope. One bale was stacked on top of another and a pressure of 1.6 pounds per square inch was applied for three weeks. After this period, the bales were easily separated without adhesion or sticking tendencies. The film did not present a rupturing problem. From the results of this test, it became apparent that the thermoplastic film composition had structural integrity during application conditions as well as indicated from the weight. Less than 2.0 minutes mill time was required to completely disperse the film in the SBR.

EXAMPLE V

An experiment was then conducted to determine the effect of the films such as those of Examples I and III on the integrity of cured rubber specimens, particularly where the film is improperly dispersed in the rubber compound. A typical SBR tire tread stock was sheeted off a mill at 0.050 inch thickness to prepare specimens for evaluation. A 4 inch × 6 inch template was used to cut two 0.050 inch tread stock samples and one film sample for each laminate to be tested. The tread stock/film/tread stock laminate, with a 1½ inch × 4 inch Teflon (TFE), a trademark of the E. I. du Pont De Nemours & Co., strip across the width, was cured in a press for about 12 minutes at about 325° F. under pressure. The specimens were removed immediately from the mold and then permitted to cool to ambient temperature or about 25° C., for evaluation. Each test specimen was carefully inspected for voids. Then, an effort was made to separate the tread stock plies at the film/- tread stock interface. Films prepared from a block polymer/resin blend of this invention effectively cured in place in the typical SBR tread stock and defied separation at the film/tread stock interface, which is equivalent to the results obtained with a control laminate of SBR stock without any resin film. In contradistinction, test specimens similarly prepared of polyethylene film/SBR and of high impact polystyrene film/SBR contained numerous voids and separated readily at the film/tread stock interface.

EXAMPLE VI

An experiment was conducted to determine the solubility of the thermoplastic resin film composite of Example I in styrene monomer. The solubility of the film was determined by measuring the time required to dissolve 5 grams of film in 95 grams of styrene monomer in a 4-ounce bottle at about 25° C. The capped bottle was agitated on a wrist action shaker. The experimental film was observed to completely dissolve in 35 minutes. These results are acceptable when compared to the typical specifications of butadiene rubber dissolving time of about 2 hours maximum time in styrene. These results also show that the film could be useful for packaging compounding ingredients such as colorants for unsaturated polyester resin/styrene monomer compositions.

While certain representative embodiments and details have been shown for the purpose of illustrating the invention, it will be apparent to those skilled in this art that various changes and modifications may be made therein without departing from the spirit or scope of the invention.

What is claimed is:

1. A packaging film composite having a thickness in the range of about 0.5 to about 10 mils comprised of an admixture of (1) about 80 to about 45 weight percent, based on 100 weight percent, of a unvulcanized elastomeric block copolymer having the general configuration A—B—A wherein each A is an independently selected nonelastomeric monovinyl aromatic hydrocarbon polymer block selected from styrene, α-methylstyrene and vinyl toluene having an average molecular weight of about 7,000 to about 25,000 and a glass transition temperature above about 25° C., the total block A content being from about 20 to about 40 percent by weight of the copolymer, and B is an elastomeric conjugated diene polymer block selected from 1,3-butadiene and isoprene having an average molecular weight from about 30,000 to about 100,000 and a glass transition temperature below about 10° C., said block copolymer being further characterized by having a melt viscosity in the range of about 0.1 to about 10 grams/10 minutes according to ASTM No. D-1238, (2) about 20 to about 55 weight percent of a thermoplastic resin selected from at least one polymer of styrene, α-methylstyrene, styrene/α-methylstyrene, vinyl toluene, vinyl toluene/α-methylstyrene, indene resins, alkyl phenolic resins, petroleum and coal tar resins, said resins characterized by being soluble in styrene and by having an intrinsic viscosity of about 0.02 to about 0.50 as determined in toluene at 30° C. and (3) a sufficient amount of an anti-blocking agent.

2. The packaging film composite of claim 1 having a thickness in the range of 0.5 to 10 mils and characterized by having an anti-block property of less than about 10 grams, comprised of an admixture of an unvulcanized radial or linear styrene-butadiene-styrene elastomeric block copolymer, at least one thermoplastic resin selected from polymers of styrene, α-methylstyrene and styrene/α-methyl-styrene and optionally containing lubricants, fillers, pigments and stabilizers.

3. In a package of an article wrapped in a film of an unvulcanized block copolymer, the improvement in which said package is comprised of (A) an article selected from at least one of unvulcanized rubber, compounding ingredients for unvulcanized rubber, and compounding ingredients for thermoplastic polymers in (B) a packaging film composite of claim 1.

4. The package of claim 3 where said film composite substantially encompasses said article, has a thickness in the range of 0.5 to 10 mils, is characterized by having an anti-block property less than about 10 grams, and is comprised of an admixture of an unvulcanized radial or linear styrene-butadiene-styrene elastomeric block copolymer, at least one thermoplastic resin selected from polymers of styrene, α-methylstyrene or styrene/α-methylstyrene and optionally containing lubricants, fillers, pigments and stabilizers.

5. The package of claim 3 where said article is an unvulcanized high unsaturation rubber tightly wrapped and optionally heat sealed with said protective film composite comprised of an admixture of said unvulcanized elastomeric block copolymer, thermoplastic resin and optionally containing lubricants, fillers, pigments and stabilizers.

6. The package of claim 5 where said article is selected from at least one of butadiene/styrene copolymers, polybutadiene and cis-1,4-polyisoprene and where, in said protective film composite, said block copolymer is a radial or linear styrene-butadiene-styrene block copolymer and said thermoplastic resin is selected from at least one polymer of styrene, α-methylstyrene and styrene/α-methylstyrene.

7. The package of claim 3 wherein said article is at least one compounding ingredient for unvulcanized rubber.

8. The package of claim 5 where said film composite substantially encompasses said article and is optionally heat sealed and said article is comprised of at least one compounding ingredient for unvulcanized high unsaturation rubber selected from resins, fillers, accelerators, antioxidants, antiozonants, sulfur and peroxide-type curatives and processing aids.

9. The package of claim 8 where said article is selected from at least one of hydrocarbon resins; fillers selected from clay, silicates and calcium carbonate; accelerators selected from cadmium diethyldithiocarbamate, tetramethyl thiuram disulfide, benzothiazyl disulfide; phenolic, substituted thio ester and amine-type antioxidants; aniline derivative, diamine and thiourea anti-ozonants; sulfur-providing and peroxide curatives; iron oxide and titanium dioxide color pigments; carbon black, zinc oxide and hydrated silicon compound reinforcing pigments; and polyethylene, silicon dioxide, pumice and stearate processing aids.

10. The package of claim 7, packaged with said film composite, optionally heat sealed, comprised of an unvulcanized elastomeric styrene-butadiene-styrene block copolymer, a thermoplastic resin selected from at least one polymer of styrene, α-methylstyrene and styrene/α-methylstyrene and optionally containing lubricants, fillers, pigments and stabilizers.

11. The package of claim 8 where said article is at least one compounding ingredient for thermoplastic polymers.

12. The package of claim 11 where said article is at least one compounding ingredient for polystyrene.

13. A compounded high unsaturation rubber prepared by mixing a package of claim 11 wherein said article is an unvulcanized high unsaturation rubber with an additional package of claim 11 wherein said article is at least one compounding ingredient for said unvulcanized high unsaturation rubber.

14. A compounded thermoplastic polymer prepared by mixing a thermoplastic polymer with a package of claim 3 wherein said article is at least one compounding ingredient for said thermoplastic polymer.

15. The compounded thermoplastic polymer of claim 14 wherein said thermoplastic polymer is polystyrene.

16. A compounded high unsaturation rubber prepared by mixing an unvulcanized high unsaturation rubber with a package of claim 7.

17. The compounded high unsaturation rubber of claim 15 where said film composite has a thickness in the range of 0.5 to 10 mils, is characterized by having an antiblock property of less than about 10 grams, and is comprised of said elastomeric block copolymer, thermoplastic resin and, optionally, containing lubricants, fillers, pigments and stabilizers.

18. The compounded rubber of claim 17, sulfur cured.

19. The compounded rubber of claim 17 where said high unsaturation rubber is selected from at least one of butadiene/styrene copolymers, polybutadiene and cis-1,4-polyisoprene and wherein, in said film composite, said block copolymer is a radial or linear styrene-butadiene-styrene block copolymer and said thermoplastic resin is selected from at least one polymer of styrene, α-methylstyrene and styrene/α-methylstyrene.

20. The compounded rubber of claim 17 where said packaged article is comprised of at least one compounding ingredient for unvulcanized high unsaturation rubber selected from resins, fillers, accelerators, antioxidants, antiozonants, sulfur and peroxide-type curatives and processing aids.

21. The compounded rubber of claim 20 where said packaged article is selected from at least one of hydrocarbon resins; fillers selected from clay, silicates and calcium carbonate; accelerators selected from cadmium diethyldithiocarbamate, tetramethyl thiuram disulfide and benzothiazyl disulfide; phenolic, substituted thioester and amine-type antioxidants; aniline derivative, diamine and thiourea antiozonants; sulfur-providing and peroxide curatives; iron oxide and titanium dioxide color pigments; carbon black, zinc oxide and hydrated silicon compound reinforcing pigments; and polyethylene, silicon dioxide, pumice and stearate processing aids.

22. The compounded rubber of claim 21 which is sulfur cured, where said rubber is selected from at least one of butadiene/styrene copolymers, polybutadiene and cis-1,4-polyisoprene and where, in said film composite, said block copolymer is a styrene-butadiene-styrene block copolymer and said thermoplastic resin is selected from at least on polymer of styrene, α-methylstyrene and styrene/α-methylstyrene.

23. In a method of preparing a package of an article wrapped in a film of an unvulcanized block copolymer, the improvement which comprises (A) wrapping an article selected from at least one of unvulcanized rubber, compounding ingredients for unvulcanized rubber, and compounding ingredients for thermoplastic polymers by substantially encompassing with a protective film composite which is compatible therewith said unvulcanized rubber or thermoplastic polymer, said film having a thickness of about 0.5 to about 10 mils and comprised of an admixture of (1) about 80 to about 45 weight percent, based on 100 percent by weight, of an unvulcanized elastomeric block copolymer having the general configuration A—B—A wherein each A is an independently selected nonelastomeric monovinyl aromatic hydrocarbon polymer block selected from styrene, α-methylstyrene and vinyl toluene having an average molecular weight of about 7,000 to about 25,000 and a glass transition temperature above about 25° C., the total block A content being from about 20 to about 40 percent by weight of the copolymer, and B is an elastomeric conjugated diene polymer block selected from 1,3-butadiene and isoprene having an average molecular weight from about 30,000 to about 100,000 and a glass transition temperature below about 10° C., said block copolyer being further characterized by having a melt viscosity in the range of about 0.1 to about 10 gms/10 min according to ASTM No. D-1238, correspondingly (2) about 20 to about 55 weight percent of at least one thermoplastic aromatic group-containing resin selected from at least one polymer of styrene, α-methyl-styrene, styrene/α-methylstyrene, vinyl toluene, vinyl toluene-/α-methyl styrene, indene resins, alkyl phenolic resins, and petroleum and coal tar resins, said resins characterized by being soluble in styrene and by having an intrinsic viscosity in toluene at 30° C. of about 0.02 to about 0.5 and (3) a sufficient amount of an antiblocking agent and, optionally, (B) heat sealing the film to form the package.

* * * * *